US008566597B2

(12) United States Patent
Takenaka et al.

(10) Patent No.: US 8,566,597 B2
(45) Date of Patent: Oct. 22, 2013

(54) DIGITAL SIGNATURE PROGRAM, DIGITAL SIGNATURE APPARATUS, AND DIGITAL SIGNATURE METHOD

(75) Inventors: Masahiko Takenaka, Kawasaki (JP); Takashi Yoshioka, Kawasaki (JP); Fumitsugu Matsuo, Shinjuku (JP); Fumiaki Chiba, Kawasaki (JP)

(73) Assignees: Fujitsu Limited, Kawasaki (JP); Fujitsu Advanced Engineering Limited, Shinjuku (JP)

( * ) Notice: Subject to any disclaimer, the term of this patent is extended or adjusted under 35 U.S.C. 154(b) by 12 days.

(21) Appl. No.: 13/137,543

(22) Filed: Aug. 24, 2011

(65) Prior Publication Data
US 2011/0314291 A1   Dec. 22, 2011

Related U.S. Application Data

(63) Continuation of application No. PCT/JP2009/053718, filed on Feb. 27, 2009.

(51) Int. Cl.
*H04L 9/32* (2006.01)

(52) U.S. Cl.
USPC .............. 713/176; 713/178; 713/193; 726/30

(58) Field of Classification Search
USPC .............................. 713/176, 178, 193; 726/30
See application file for complete search history.

(56) References Cited

U.S. PATENT DOCUMENTS

| 4,309,569 A | 1/1982 | Merkle | |
|---|---|---|---|
| 4,558,302 A * | 12/1985 | Welch | 341/51 |
| 6,128,623 A * | 10/2000 | Mattis et al. | 711/118 |
| 7,043,637 B2 * | 5/2006 | Bolosky et al. | 713/171 |
| 7,882,351 B2 * | 2/2011 | Serret-Avila | 713/161 |

(Continued)

FOREIGN PATENT DOCUMENTS

| EP | 1890451 A1 | 2/2008 |
|---|---|---|
| JP | 2005-32130 | 2/2005 |

(Continued)

OTHER PUBLICATIONS

Notification of Transmittal of Translation of the International Preliminary Report on Patentability for International Application PCT/JP2009/053718; Form PCT/IB/338; mailing date Sep. 22, 2011.

(Continued)

*Primary Examiner* — Carl Colin
*Assistant Examiner* — Mohammad A Siddiqi
(74) *Attorney, Agent, or Firm* — Staas & Halsey LLP

(57) ABSTRACT

When input data ($f_0$) is read into a digital signature generating apparatus, a hash value ($h_0$) is calculated. The hash value ($h_0$) is stored to a storage area (M1), which has the highest priority rank among 5 storage areas. Subsequently, when input data ($f_1$) is read in, a hash value ($h_1$) is calculated. Since the storage area (M1) is already occupied by the hash value ($h_0$), the hash value ($h_0$) is read out from storage area (M1), emptying the storage area (M1). The read hash value ($h_0$) and the hash value ($h_1$) are concatenated, forming a concatenated hash value ($h_0|h_1$) and a hash value ($h_{0,1}$) is calculated. The hash value ($h_{0,1}$) is stored to a storage area (M2), which has the highest priority rank after the storage area (M1). When input data ($f_2$) is read in, a hash value ($h_2$) is calculated and stored to the storage area (M1).

9 Claims, 15 Drawing Sheets

(56) References Cited

U.S. PATENT DOCUMENTS

| | | | |
|---|---|---|---|
| 7,996,679 B2* | 8/2011 | Hsu et al. | 713/176 |
| 8,037,312 B2* | 10/2011 | Takenaka et al. | 713/177 |
| 8,131,998 B2* | 3/2012 | Wang et al. | 713/161 |
| 2002/0194209 A1* | 12/2002 | Bolosky et al. | 707/205 |
| 2004/0022271 A1* | 2/2004 | Fichet et al. | 370/486 |
| 2005/0065943 A1 | 3/2005 | Miyata et al. | |
| 2007/0106908 A1* | 5/2007 | Miyazaki et al. | 713/189 |
| 2008/0256362 A1 | 10/2008 | Takenaka et al. | |
| 2009/0164793 A1* | 6/2009 | Yoshioka et al. | 713/180 |
| 2009/0328218 A1 | 12/2009 | Tsurukawa | |
| 2010/0083003 A1* | 4/2010 | Spackman | 713/193 |

FOREIGN PATENT DOCUMENTS

| | | |
|---|---|---|
| JP | 2008-178048 | 7/2008 |
| WO | 2006/132143 A1 | 12/2006 |
| WO | 2008/026238 A1 | 3/2008 |

OTHER PUBLICATIONS

Written Opinion of the International Searching Authority; Form PCT/ISA/237; mailing date Mar. 31, 2009.

International Search Report for PCT/JP2009/053718, mailed Mar. 31, 2009.

* cited by examiner

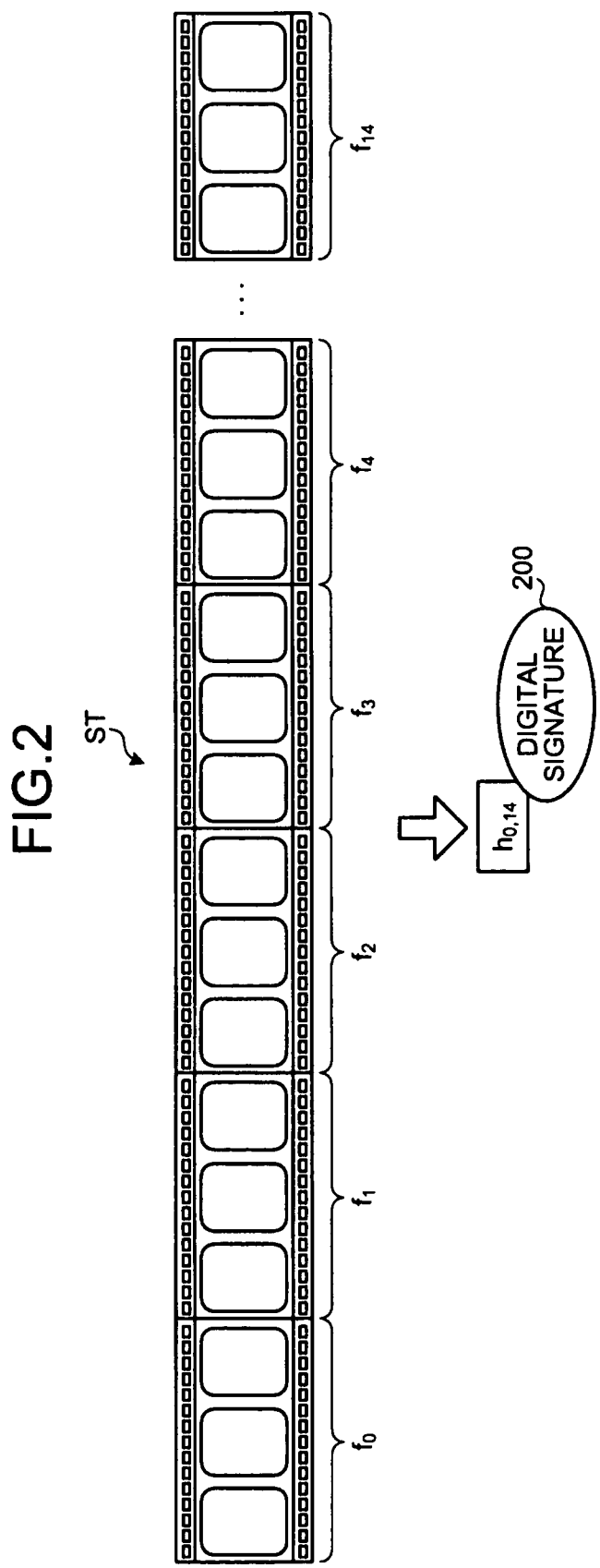

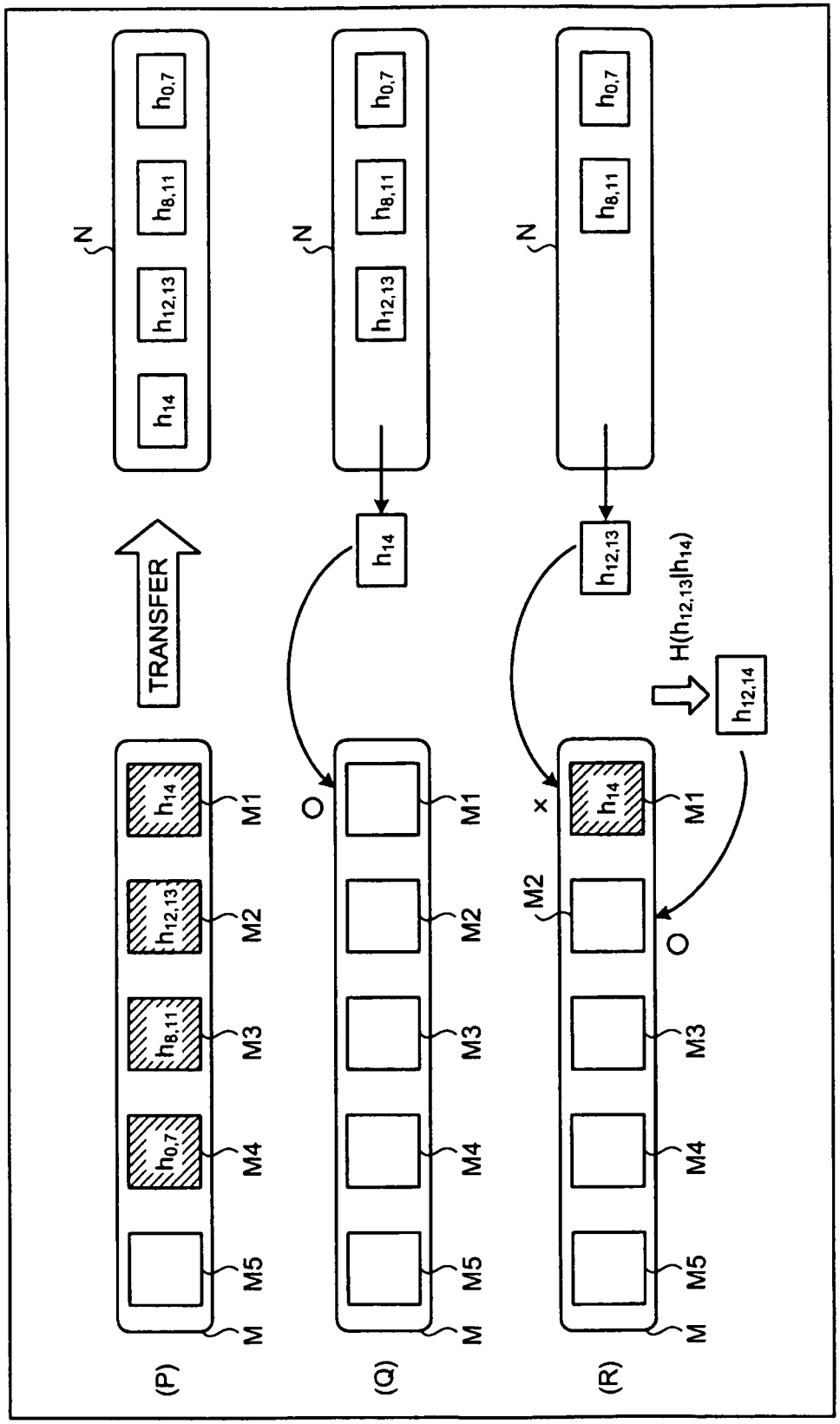

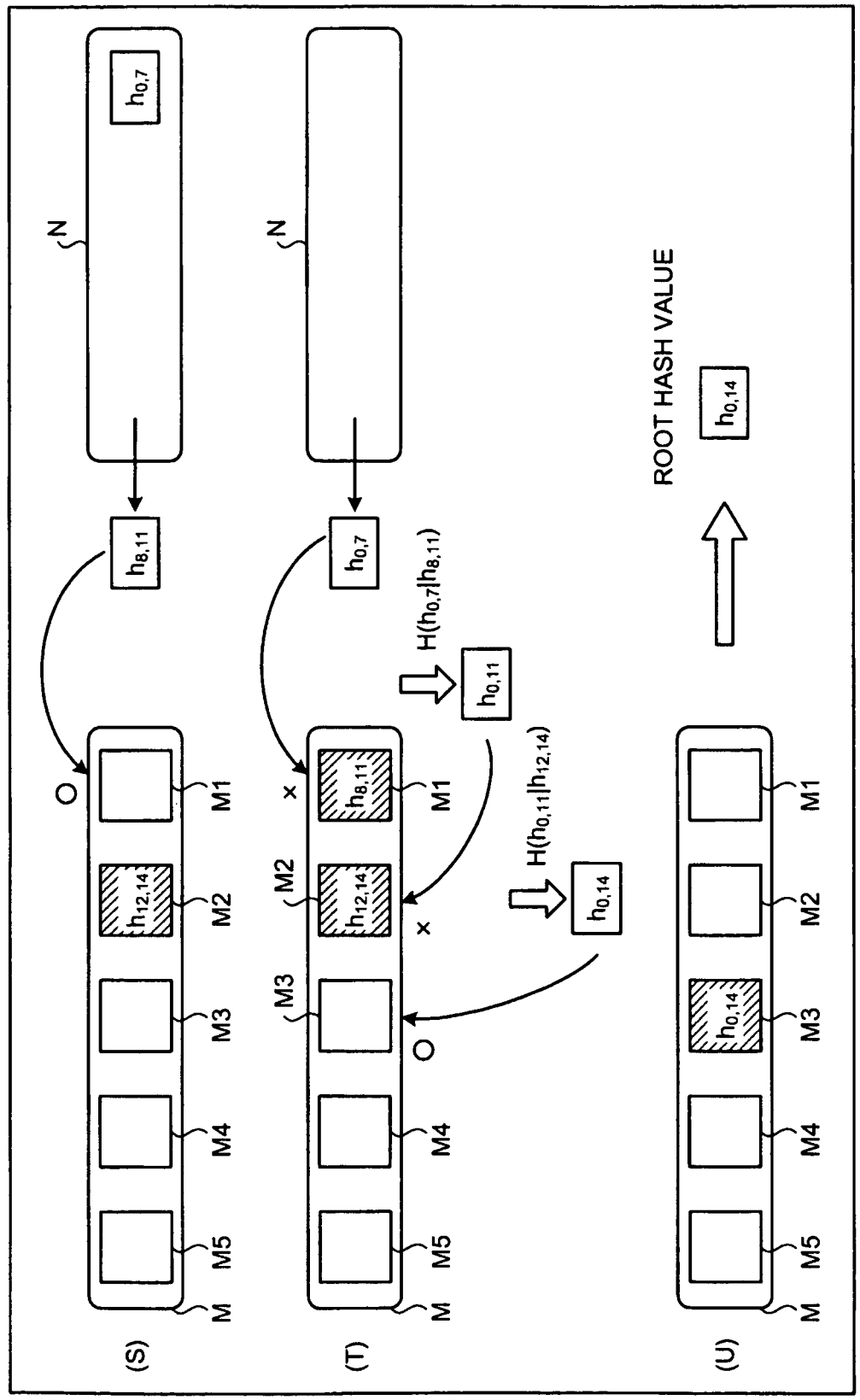

FIG.10

| | SUCCESSIVE PROCESSING | NUMBER OF REGISTERS/ MEMORY | NUMBER OF TIMES HASH PROCESSING EXECUTED DURING FILMING | NUMBER OF TIMES HASH PROCESSING EXECUTED AFTER FILMING | TOTAL NUMBER OF TIMES HASH PROCESSING EXECUTED |
|---|---|---|---|---|---|
| CONVENTIONAL TECHNOLOGY | NOT POSSIBLE | $n$ | $n$ | $n-1$ | $2n-1$ |
| PRESENT EMBODIMENT | POSSIBLE | $\lfloor \log_2 n + 1 \rfloor$ | $\approx 2n-1$ | $\leq \lfloor \log_2 n \rfloor$ | $2n-1$ | ered by a bus 105.

DIGITAL SIGNATURE PROGRAM, DIGITAL SIGNATURE APPARATUS, AND DIGITAL SIGNATURE METHOD

CROSS REFERENCE TO RELATED APPLICATIONS

This application is a continuation application of International Application PCT/JP2009/053718, filed Feb. 27, 2009, and designating the U.S., the entire contents of which are incorporated herein by reference.

FIELD

The embodiment discussed herein is related to digital signature generation.

BACKGROUND

Technology has been disclosed that divides moving picture/audio data that is stream data to be digitally signed, generates a hash tree using the resulting data portions as leaves, and obtains the root hash value to digitally sign the stream data (for example, refer to Japanese Laid-Open Patent Publication No. 2008-178048). In this conventional technology, registers/memory capable of storing the data portions are assumed.

FIG. 11 is a diagram depicting a conventional hash tree generation method. The stream data is divided into multiple data portions. If Moving Picture Experts Group (MPEG)-1 stream data is to be divided into extractable data portions, division according to pixels or Group of Picture (GOP) units may be considered. GOP is the smallest unit of a moving picture (compilation of images), a unit by which independent playback is possible, and a structure for playing back and editing a moving picture partway through. Here, for simplicity, GOP units are assumed for the division into data portions.

At step (A) in FIG. 11, stream data is divided into input data $f_0$ to $f_{14}$ and each is substituted into a hash function H( ) and resulting hash values $h_0$ to $h_{14}$ are stored to registers/memory.

At step (B), adjacent hash values among the hash values $h_0$ to $h_{14}$ obtained at step (A) are concatenated. "hx|hy" (where, x and y are numbers) is a code string in which the tail of hash value hx and the head of hash value by are concatenated. Further, hx,y is the hash value obtained when the concatenated hash value is substituted into the hash function. At steps (C) to (E) as well, the operations are similarly repeated. At step (E), since a singular hash value results, the resulting hash value $h_{0,14}$ is the root hash value.

Thus, in the conventional technology, to generate a hash tree according to steps (A) to (E), registers/memory of a large capacity to take in all of the stream data is necessary. Further, after all of the stream data is read in, it takes time for processing to generate a hash tree according to steps (A) to (E).

The technology disclosed herein addresses the realization of significant reductions in the register/memory capacity required and in the time consumed for post-processing, by enabling successive processing for tree generation in real-time.

SUMMARY

According to an aspect of an embodiment, a computer-readable, non-transitory medium stores therein a digital signature program that causes a computer to execute a procedure. The procedure includes acquiring in order of input, a series of input data that are successively input; calculating a unique value for the acquired input data or for target data, by substituting the input data or the target data into a one-way function; judging whether a target area selected from among a storage area group assigned priority ranks, is empty; storing the unique value calculated for the input data or for the target data to the target area, if the target area is judged to be empty at the judging; setting newly as the target data, a concatenated unique value concatenating the unique value stored in the target area and, the unique value of the input data or the unique value of the target data, if the target area is judged to not be empty at the judging; selecting from the storage area group and as the target area, the storage area having the highest priority rank, if the unique value of the input data is calculated, and if the target area is judged to not be empty at the judging, newly selecting as the target area, the storage area having the highest priority rank after the storage area previously selected as the target area; and determining based on the number of unique values stored in the storage area group after acquisition of the series of input data, a unique value to be a generation origin of a digital signature for the series of input data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 depicts an example of an input data group.
FIG. 4A is a diagram of a second storage processing (part 1).
FIG. 4B is a diagram of the second storage processing (part 2).
FIG. 10 is a table comparing the present embodiment and conventional technology depicted in FIG. 11.

DESCRIPTION OF EMBODIMENTS

Preferred embodiments of the present invention will be explained with reference to the accompanying drawings.

Figure 1:
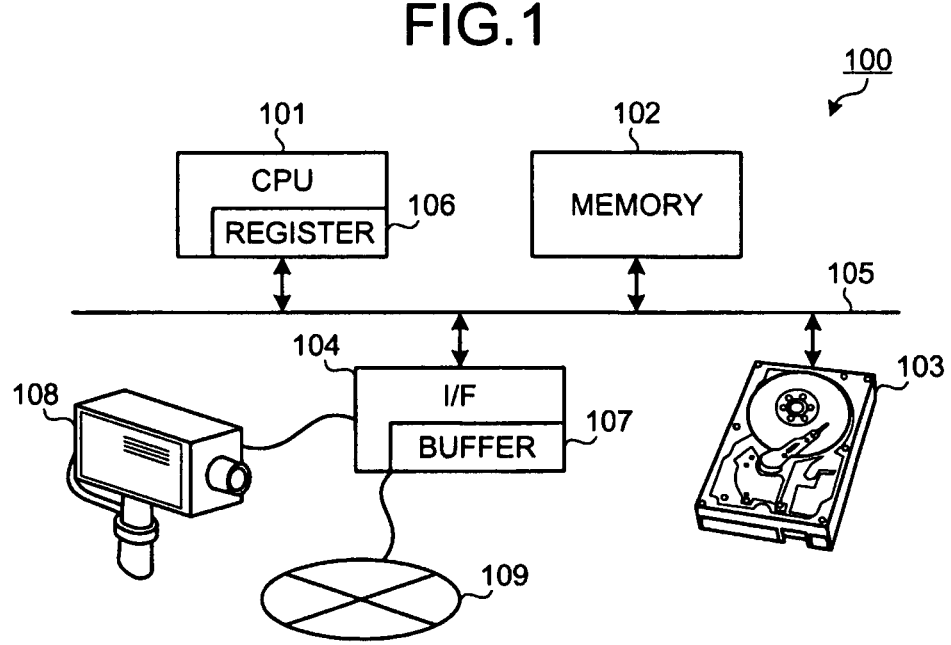
FIG. 1 is a block diagram of a hardware configuration of a digital signature apparatus.

FIG. 1 is a block diagram of a hardware configuration of a digital signature apparatus. As depicted a digital signature apparatus 100 includes a central processing unit (CPU) 101, memory 102, a hard disk drive 103, and an interface (I/F) 104, respectively connected by a bus 105.

Here, the CPU 101 governs overall control of the digital signature apparatus 100. The CPU 101 has an internal register 106 that stores various types of data. The register 106 may be external to the CPU 101. The memory 102 is a primary storage unit storing various types of data and is further used as a work area of the CPU 101. The memory 102 is configured by, for example, read only memory (ROM), random access memory (RAM), flash memory, etc.

The hard disk drive 103 has a hard disk storing various types of data, such as the digital signature program of the technology disclosed herein (or may be stored in the memory 102), a browser, and operating system (OS). The I/F 104 acquires data from an external apparatus (e.g., a digital video camera 108), a network 109, etc. and further outputs data to an external apparatus and to the network 109. The I/F 104 has a buffer 107, temporarily stores data from external apparatuses and the network 109, and sends data to storage areas such as the register 106, the memory 102, and the hard disk.

FIG. 2 depicts an example of an input data group. In FIG. 2, stream data ST that is to be digitally signed and is a moving picture or audio is divided into multiple input data $f_0$ to $f_{14}$. As in FIG. 11, for simplicity, the division into the input data $f_0$ to $f_{14}$ is in a unit of GOP. Concerning the hash values of the input data $f_0$ to $f_{14}$, binary tree processing is performed, whereby a root hash value $h_{0,14}$ is ultimately obtained and a digital signature 200 is generated.

Next, a detailed example of hash tree generation according to the present embodiment will be described. The hash tree generation according to the present embodiment can be divided roughly into to 2 phases. The first phase involves storing hash values obtained from a series of input data that result from a division of stream data, the hash values being stored to target areas sequentially selected from among storage areas assigned priority ranks. Hereinafter, the first phase is referred to as first storage processing.

The second phase causes the first storage processing to be executed again, if the generation of the hash tree is not completed at the first storage processing. Hereinafter, the second phase is referred to as second storage processing. The second storage processing causes operations to be repeated until a single hash value is obtained. The storage areas store unique values obtained from a one-way function (e.g., a hash function) and may be, for example, multiple units of the register 106, or address-designated storage areas in the memory 102 or the hard disk of the hard disk drive 103.

Herein, an example using the input data depicted in FIG. 2 will be described. In FIGS. 3A to 3E, the first storage processing will be described and in FIGS. 4A and 4B, the second storage processing will be described. Furthermore, 5 storage areas are set as storage areas M1 to M5, to which priority ranks are assigned. In this example, in the storage area group M, the storage area M1 farthest on the right is assumed to have the highest priority rank and the storage areas to the left thereof have progressively decreasing priority ranks, where the storage area M5 farthest on the left has the lowest priority rank. Furthermore, the series of input data is assumed to be read-in in the order of input data $f_0, f_1, f_2, \ldots, f_{14}$.

Figure 3A:
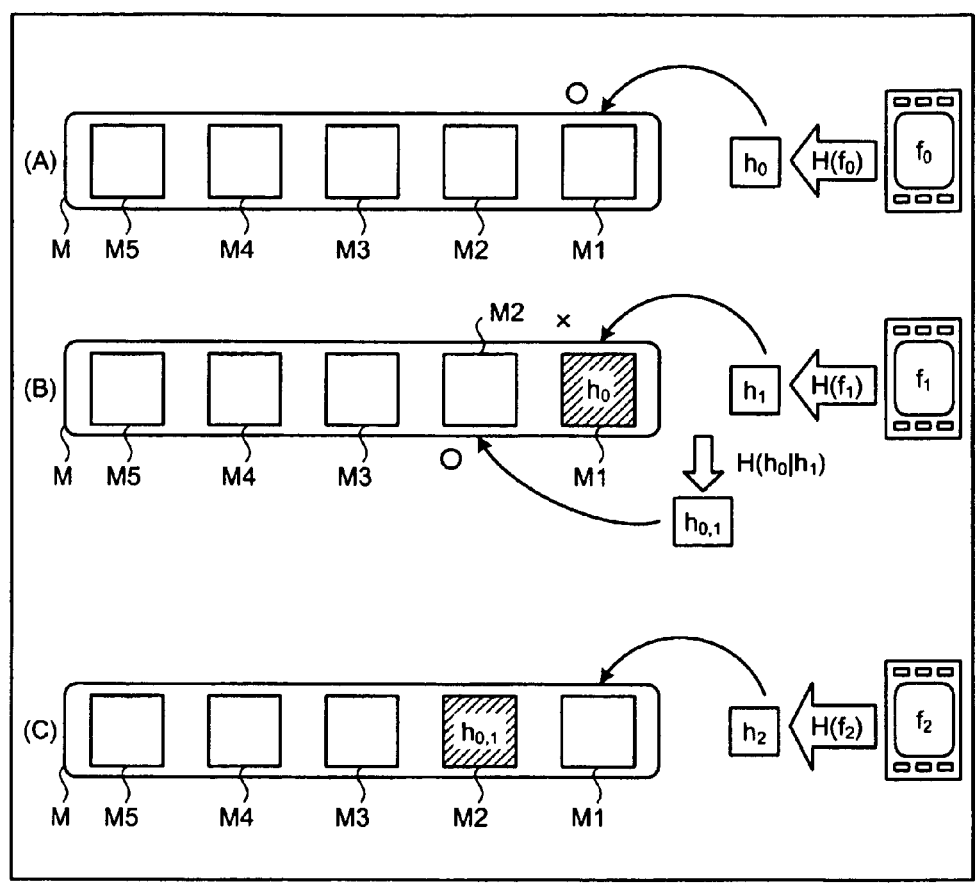
FIG. 3A is a diagram of a first storage processing (part 1).

FIG. 3A is a diagram of the first storage processing (part 1). Reference character (A) in FIG. 3A depicts an initial state and therefore, the 5 storage areas M1 to M5 are empty. When the input data $f_0$ is read in, a hash value $h_0$ is calculated using a hash function H( ). The hash value $h_0$ is stored to the storage area M1 having the highest priority rank among the 5 storage areas.

Reference character (B) depicts a state in which the hash value $h_0$ occupies the storage area M1. When the input data $f_1$ is read in, a hash value $h_1$ is calculated using the hash function H( ). Since the storage area M1 is already occupied by the hash value $h_0$, the hash value $h_0$ is read out from the storage area M1, emptying the storage area M1. The read hash value $h_0$ and the hash value $h_1$ are concatenated, forming a concatenated hash value $h_0|h_1$. The concatenated hash value $h_0|h_1$ is a code string in which the tail of the hash value $h_0$ and the head of the hash value $h_1$ are concatenated. The concatenated hash value $h_0|h_1$ is substituted into the hash function H( ) and a hash value $h_{0,1}$ is calculated. The hash value $h_{0,1}$ is stored to the storage area M2 having the highest priority rank after the storage area M1.

Reference character (C) depicts a state in which the hash value $h_{0,1}$ occupies the storage area M2. When the input data $f_2$ is read in, a hash value $h_2$ is calculated using the hash function H( ). The hash value $h_2$ is stored to the storage area M1 having the highest priority rank among the 5 storage areas.

Figure 3B:
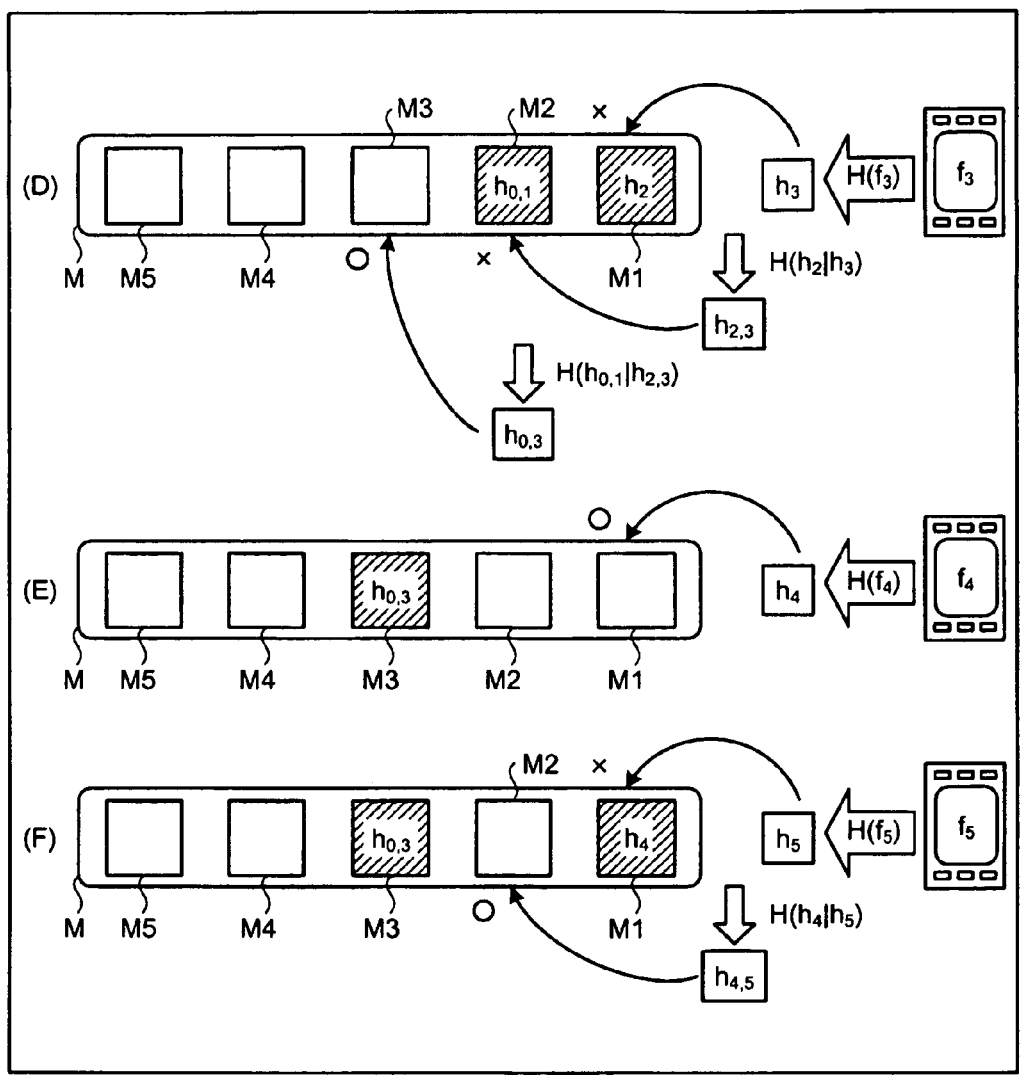
FIG. 3B is a diagram of the first storage processing (part 2).

FIG. 3B is a diagram of the first storage processing (part 2). Reference character (D) depicts a state in which the hash value $h_2$ occupies the storage area M1 and the hash value $h_{0,1}$ occupies the storage area M2. When the input data $f_3$ is read in, a hash value $h_3$ is calculated using the hash function H( ). However, the storage area M1 is already occupied by the hash value $h_2$.

In this case, the hash value $h_2$ is read out from the storage area M1, emptying the storage area M1. The read hash value $h_2$ and the hash value $h_3$ are concatenated, forming a concatenated hash value $h_2|h_3$. The concatenated hash value $h_2|h_3$ is a code string in which the tail of the hash value $h_2$ and the head of the hash value $h_3$ are concatenated. The concatenated hash value $h_2|h_3$ is substituted into the hash function H( ) and a hash value $h_{2,3}$ is calculated.

Since the storage area M2 having the highest priority after the storage area M1 is already occupied by the hash value $h_{0,1}$, the hash value $h_{0,1}$ is read out from the storage area M2, emptying the storage area M2. The read hash value $h_{0,1}$ and the hash value $h_{2,3}$ are concatenated, forming a concatenated hash value $h_{0,1}|h_{2,3}$. The concatenated hash value $h_{0,1}|h_{2,3}$ is a code string in which the tail of the hash value $h_{0,1}$ and the head of the hash value $h_{2,3}$ are concatenated. The concatenated hash value $h_{0,1}|h_{2,3}$ is substituted into the hash function H( ) and a hash value $h_{0,3}$ is calculated. The hash value $h_{0,3}$ is stored to the storage area M3 having the highest priority rank after the storage area M2.

Reference character (E) depicts a state in which the hash value $h_{0,3}$ occupies the storage area M3. When the input data $f_4$ is read in, a hash value $h_4$ is calculated using the hash function H( ). The hash value $h_4$ is stored to the storage area M1 having the highest priority rank among the 5 storage areas.

Reference character (F) depicts a state in which the hash value $h_4$ occupies the storage area M1 and the hash value $h_{0,3}$ occupies the storage area M3. When the input data $f_5$ is read in, a hash value $h_5$ is calculated using the hash function H( ). However, the storage area M1 is already occupied by the hash value $h_4$.

In this case, the hash value $h_4$ is read out from the storage area M1, emptying the storage area M1. The read hash value $h_4$ and the hash value $h_5$ are concatenated, forming a concatenated hash value $h_4|h_5$. The concatenated hash value $h_4|h_5$ is a code string in which the tail of the hash value $h_4$ and the head of the hash value $h_5$ are concatenated. The concatenated hash value $h_4|h_5$ is substituted into the hash function H( ) and a hash value $h_{4,5}$ is calculated. The hash value $h_{4,5}$ is stored to the storage area M2 having the highest priority rank after the storage area M1.

Figure 3C:
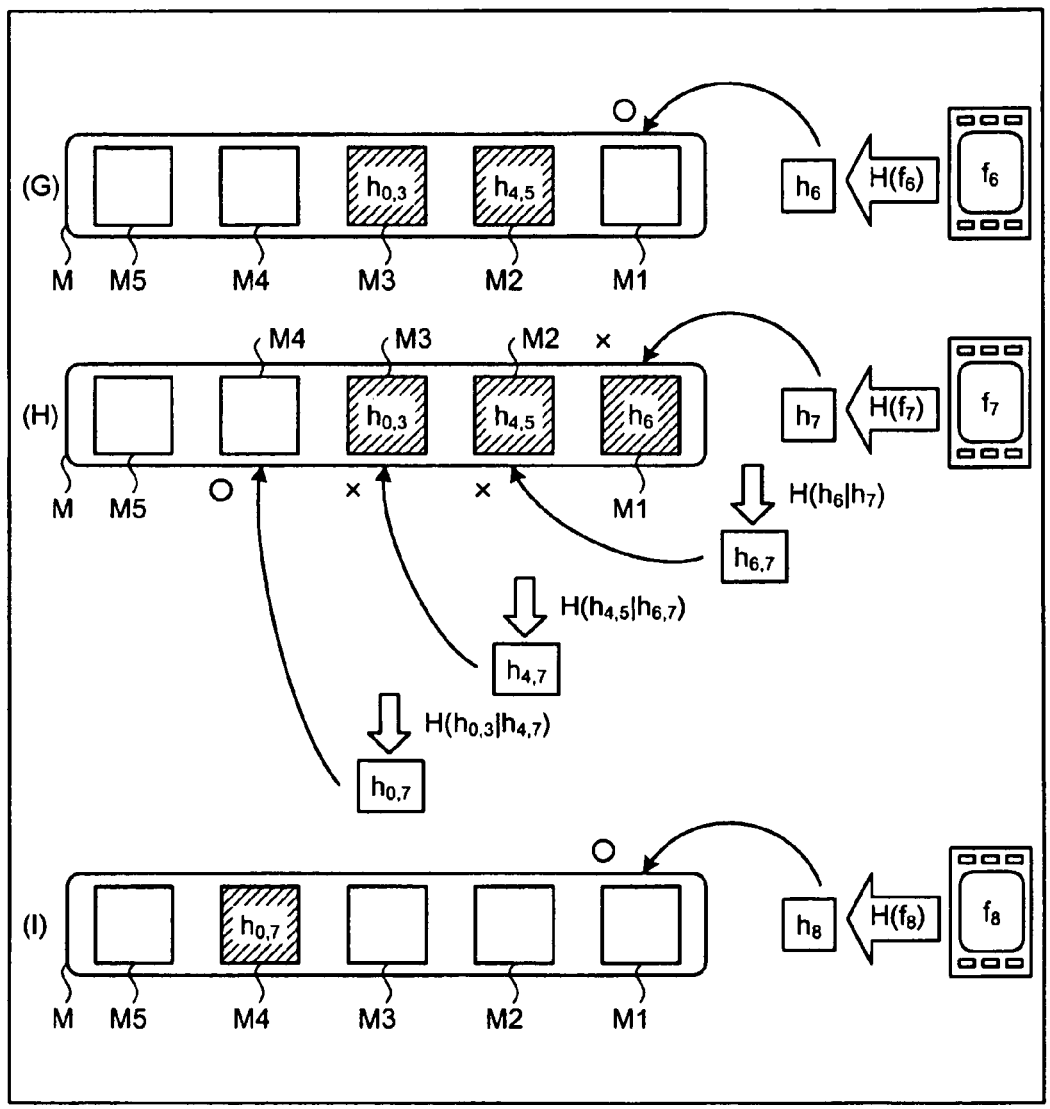
FIG. 3C is a diagram of the first storage processing (part 3).

FIG. 3C is a diagram of the first storage processing (part 3). Reference character (G) depicts a state in which the hash value $h_{4,5}$ occupies the storage area M2 and the hash value $h_{0,3}$ occupies the storage area M3. When the input data $f_6$ is read in, a hash value $h_6$ is calculated using the hash function $H(\ )$. The hash value $h_6$ is stored to the storage area M1 having the highest priority rank among the 5 storage areas.

Reference character (H) depicts a state in which the hash value $h_6$ occupies the storage area M1, the hash value $h_{4,5}$ occupies the storage area M2, and the concatenated hash value $h_{0,3}$ occupies the storage area M3. When the input data $f_7$ is read in, a hash value $h_7$ is calculated using the hash function $H(\ )$. However, the storage area M1 is already occupied by the hash value $h_6$.

In this case, the hash value $h_6$ is read out from the storage area M1, emptying the storage area M1. The read hash value $h_6$ and the hash value $h_7$ are concatenated, forming a concatenated hash value $h_6|h_7$. The concatenated hash value $h_6|h_7$ is a code string in which the tail of the hash value $h_6$ and the head of the hash value $h_7$ are concatenated. The concatenated hash value $h_6|h_7$ is substituted into the hash function $H(\ )$ and a hash value $h_{6,7}$ is calculated.

Since the storage area M2 having the highest priority rank after the storage area M1 is already occupied by the hash value $h_{4,5}$, the hash value $h_{4,5}$ is read out from the storage area M2, emptying the storage area M2. The read hash value $h_{4,5}$ and the hash value $h_{6,7}$ are concatenated, forming a concatenated hash value $h_{4,5}|h_{6,7}$. The concatenated hash value $h_{4,5}|h_{6,7}$ is a code string in which the tail of the hash value $h_{4,5}$ and the head of the hash value $h_{6,7}$ are concatenated. The concatenated hash value $h_{4,5}|h_{6,7}$ is substituted into the hash function $H(\ )$ and a hash value $h_{4,7}$ is calculated.

Since the storage area M3 having the highest priority rank after the storage area M2 is already occupied by the hash value $h_{0,3}$, the hash value $h_{0,3}$ is read out from the storage area M3, emptying the storage area M3. The read hash value $h_{0,3}$ and the hash value $h_{4,7}$ are concatenated, forming a concatenated hash value $h_{0,3}|h_{4,7}$. The concatenated hash value $h_{0,3}|h_{4,7}$ is a code string in which the tail of the hash value $h_{0,3}$ and the head of the hash value $h_{4,7}$ are concatenated. The concatenated hash value $h_{0,3}|h_{4,7}$ is substituted into the hash function $H(\ )$ and a hash value $h_{0,7}$ is calculated. The hash value $h_{0,7}$ is stored to the storage area M4 having the highest priority rank after the storage area M3.

Reference character (I) depicts a state in which the hash value $h_{0,7}$ occupies the storage area M4. When the input data $f_8$ is read in, a hash value $h_8$ is calculated using the hash function $H(\ )$. The hash value $h_8$ is stored to the storage area M1 having the highest priority rank among the 5 storage areas.

Figure 3D:
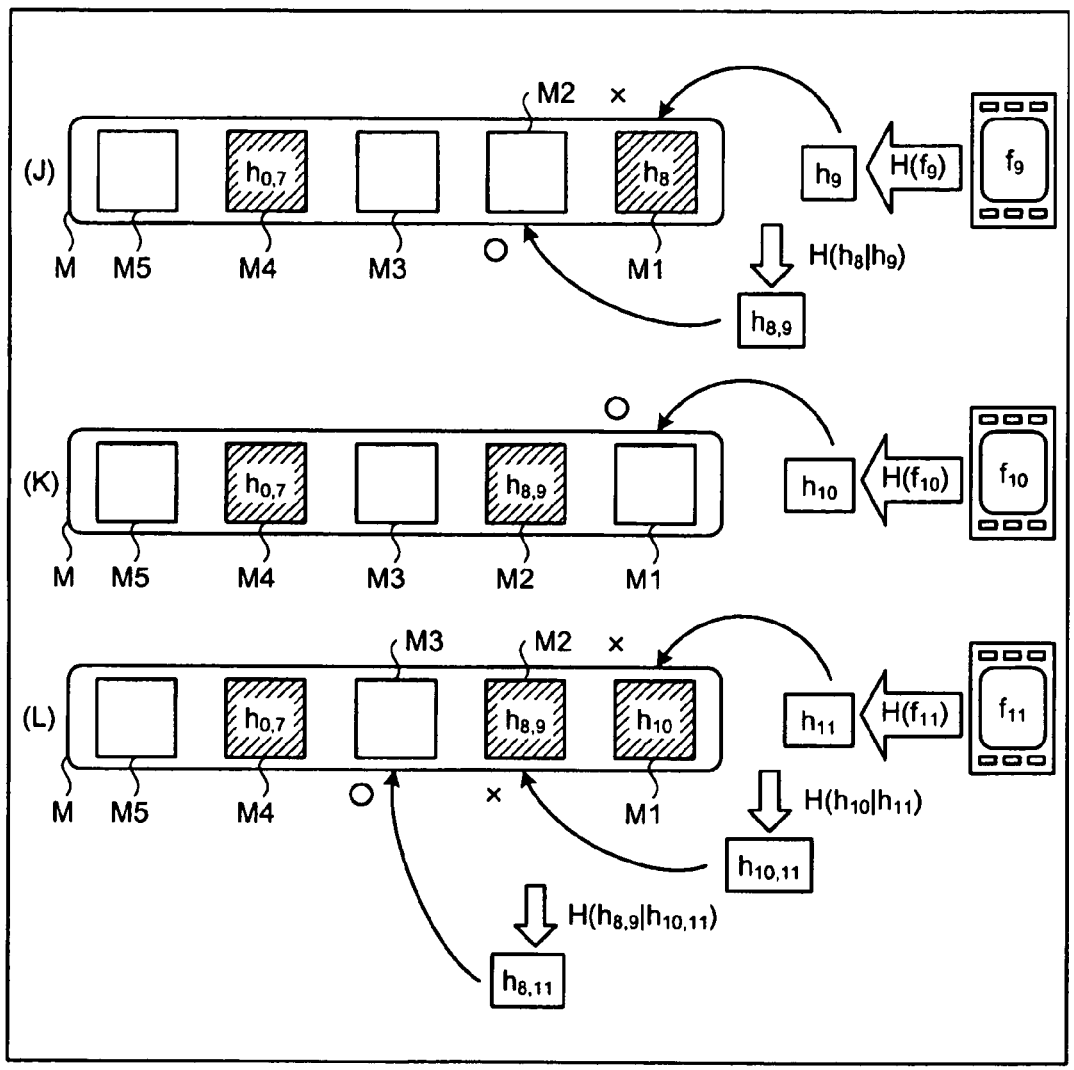
FIG. 3D is a diagram of the first storage processing (part 4).

FIG. 3D is a diagram of the first storage processing (part 4). Reference character (J) depicts a state in which the hash value $h_8$ occupies the storage area M1 and the hash value $h_{0,7}$ occupies the storage area M4. When the input data $f_9$ is read in, a hash value $h_9$ is calculated using the hash function $H(\ )$. However, the storage area M1 is already occupied by the hash value $h_8$.

In this case, the hash value $h_8$ is read out from the storage area M1, emptying the storage area M1. The read hash value $h_8$ and the hash value $h_9$ are concatenated, forming a concatenated hash value $h_8|h_9$. The concatenated hash value $h_8|h_9$ is a code string in which the tail of the hash value $h_8$ and the head of the hash value $h_9$ are concatenated. The concatenated hash value $h_8|h_9$ is substituted into the hash function $H(\ )$ and a hash value $h_{8,9}$ is calculated. The hash value $h_{8,9}$ is stored to the storage area M2 having the highest priority rank after the storage area M1.

Reference character (K) depicts a state in which the hash value $h_{8,9}$ occupies the storage area M2 and the hash value $h_{0,7}$ occupies the storage area M4. When the input data $f_{10}$ is read in, a hash value $h_{10}$ is calculated using the hash function $H(\ )$. The hash value $h_{10}$ is stored to the storage area M1 having the highest priority rank among the 5 storage areas.

Reference character (L) depicts a state in which the hash value $h_{10}$ occupies the storage area M1, the hash value $h_{8,9}$ occupies the storage area M2, and the hash value $h_{0,7}$ occupies the storage area M4. When the input data $f_{11}$ is read in, a hash value $h_{11}$ is calculated using the hash function $H(\ )$. However, the storage area M1 is already occupied by the hash value $h_{10}$.

In this case, the hash value $h_{10}$ is read out from the storage area M1, emptying the storage area M1. The read hash value $h_{10}$ and the hash value $h_{11}$ are concatenated, forming a concatenated hash value $h_{10}|h_{11}$. The concatenated hash value $h_{10}|h_{11}$ is a code string in which the tail of the hash value $h_{10}$ and the head of the hash value $h_{11}$ are concatenated. The concatenated hash value $h_{10}|h_{11}$ is substituted into the hash function $H(\ )$ and a hash value $h_{10,11}$ is calculated.

Since the storage area M2 having the highest priority rank after the storage area M1 is already occupied by the hash value $h_{8,9}$, the hash value $h_{8,9}$ is read out from the storage area M2, emptying the storage area M2. The read hash value $h_{8,9}$ and the hash value $h_{10,11}$ are concatenated, forming a concatenated hash value $h_8|h_{11}$. The concatenated hash value $h_8|h_{11}$ is a code string in which the tail of the hash value $h_{8,9}$ and the head of the hash value $h_{10,11}$ are concatenated. The concatenated hash value $h_8|h_{11}$ is substituted into the hash function $H(\ )$ and a hash value $h_{8,11}$ is calculated. The hash value $h_{8,11}$ is stored to the storage area M3 having the highest priority rank after the storage area M2.

Figure 3E:
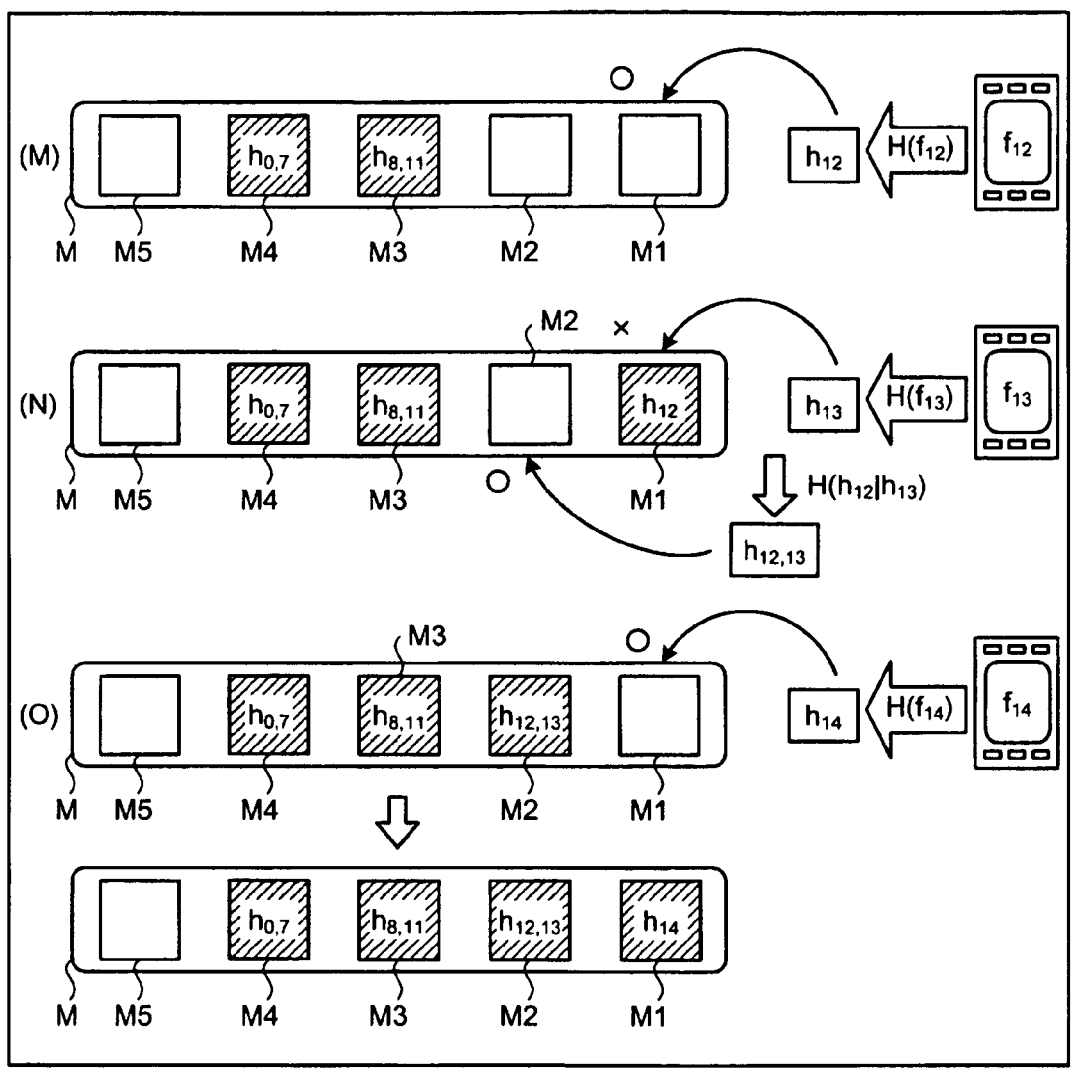
FIG. 3E is a diagram of the first storage processing (part 5).

FIG. 3E is a diagram of the first storage processing (part 5). Reference character (M) depicts a state in which the hash value $h_{8,11}$ occupies the storage area M3 and the hash value $h_{0,7}$ occupies the storage area M4. When the input data $f_{12}$ is read in, a hash value $h_{12}$ is calculated using the hash function $H(\ )$. The hash value $h_{12}$ is stored to the storage area M1 having the highest priority rank among the 5 storage areas M1 to M5.

Reference character (N) depicts a state in which the hash value $h_{12}$ occupies the storage area M1, the hash value $h_{8,11}$ occupies the storage area M3, and the hash value $h_{0,7}$ occupies the storage area M4. When the input data $f_{13}$ is read in, a hash value $h_{13}$ is calculated using the hash function $H(\ )$. However, the storage area M1 is already occupied by the hash value $h_{12}$.

In this case, the hash value $h_{12}$ is read out from the storage area M1, emptying the storage area M1. The read hash value $h_{12}$ and the hash value $h_{13}$ are concatenated, forming a concatenated hash value $h_{12}|h_{13}$. The concatenated hash value $h_{12}|h_{13}$ is a code string in which the tail of the hash value $h_{12}$ and the head of the hash value $h_{13}$ are concatenated. The concatenated hash value $h_{12}|h_{13}$ is substituted into the hash function $H(\ )$ and a hash value $h_{12,13}$ is calculated. The hash value $h_{12,13}$ is stored to the storage area M2 having the highest priority rank after the storage area M1.

Reference character (O) depicts a state in which the concatenated hash value $h_{12,13}$ occupies the storage area M2, the hash value $h_{8,11}$ occupies the storage area M3, and the hash value $h_{0,7}$ occupies the storage area M4. When the last input data $f_{14}$ is read in, a hash value $h_{14}$ is calculated using the hash function $H(\ )$. The hash value $h_{14}$ is stored to the storage area M1 having the highest priority among the 5 storage areas.

Thus, if a series of input data $f_0$ to $f_{14}$ is read in, a state results where the hash value $h_{14}$ is stored in the storage area M1, the hash value $h_{12,13}$ is stored in the storage area M2, the hash value $h_{8,11}$ is stored in the storage area M3, and the hash value $h_{0,7}$ is stored in the storage area M4. Subsequently, transition to the second storage processing (second phase) occurs.

FIG. 4A is a diagram of the second storage processing (part 1). Reference character (P) depicts a state in which the hash values $h_{14}$, $h_{12,13}$, $h_{8,11}$, and $h_{0,7}$ stored in the storage area group M are transferred to another storage area N, emptying the storage area group M. It is sufficient for the storage area N to be of a capacity equivalent to that of the storage area group M. Reference character (Q) and reference characters thereafter depict states in which reading from the storage area N is according to the priority rank of each storage area Mj stored in the storage area group M. For example, reading is in the sequence of the hash value $h_{14}$, $h_{12,13}$, $h_{8,11}$, $h_{0,7}$.

Reference character (Q) depicts a state in which the 5 storage areas are empty. When the hash value $h_{14}$ is read in, the hash value $h_{14}$ is stored to the storage area M1 having the highest priority rank among the 5 storage areas.

Reference character (R) depicts a state in which the hash value $h_{14}$ occupies the storage area M1. When the hash value $h_{12,13}$ is read in, the hash value $h_{14}$ is read out from the storage area M1, emptying the storage area M1. The read hash value $h_{14}$ and the hash value $h_{12,13}$ are concatenated, forming a concatenated hash value $h_{12}|h_{14}$. The concatenated hash value $h_{12,13}|h_{14}$ is a code string in which the tail of the hash value $h_{12,13}$ and the head of the hash value $h_{14}$ are concatenated. The concatenated hash value $h_{12,13}|h_{14}$ is substituted into the hash function H( ) and a hash value $h_{12,14}$ is calculated. The hash value $h_{12,14}$ is stored to the storage area M2 having the highest priority rank after the storage area M1.

FIG. 4B is a diagram of the second storage processing (part 2). Reference character (S) depicts a state in which the hash value $h_{12,14}$ occupies the storage area M2. When the hash value $h_{8,11}$ is read in, the hash value $h_{8,11}$ is stored to the storage area M1 having the highest priority rank among the 5 storage areas.

Reference character (T) depicts a state in which the hash value $h_{8,11}$ occupies the storage area M1 and the hash value $h_{12,14}$ occupies the storage area M2. When the last hash value $h_{0,7}$ is read in, the hash value $h_{8,11}$ is read out from the storage area M1, emptying the storage area M1. The read hash value $h_{8,11}$ and the hash value $h_{0,7}$ are concatenated, forming a concatenated hash value $h_{0,7}|h_{8,11}$. The concatenated hash value $h_{0,7}|h_{8,11}$ is a code string in which the tail of the hash value $h_{0,7}$ and the head of the hash value $h_{8,11}$ are concatenated. The concatenated hash value $h_{0,7}|h_{8,11}$ is substituted into the hash function H( ) and a hash value $h_{0,11}$ is calculated.

Since the storage area M2 having the highest priority rank after the storage area M1 is already occupied by the hash value $h_{12,14}$, the hash value $h_{12,14}$ is read out from the storage area M2, emptying the storage area M2. The read hash value $h_{12,14}$ and the hash value $h_{0,11}$ are concatenated, forming a concatenated hash value $h_{0,11}|h_{12,14}$. The concatenated hash value $h_{0,11}|h_{12,14}$ is a code string in which the tail of the hash value $h_{0,11}$ and the head of the hash value $h_{12,14}$ are concatenated.

The concatenated hash value $h_{0,11}|h_{12,14}$ is substituted into the hash function H( ) and a hash value $h_{0,14}$ is calculated. The hash value $h_{0,14}$ is stored to the storage area M3 having the highest priority rank after the storage area M2. Since no hash values remain in the storage area N and in the storage area group M, a single hash value (the hash value $h_{0,14}$) remains, the hash value $h_{0,14}$ is the root hash value.

Figure 5:
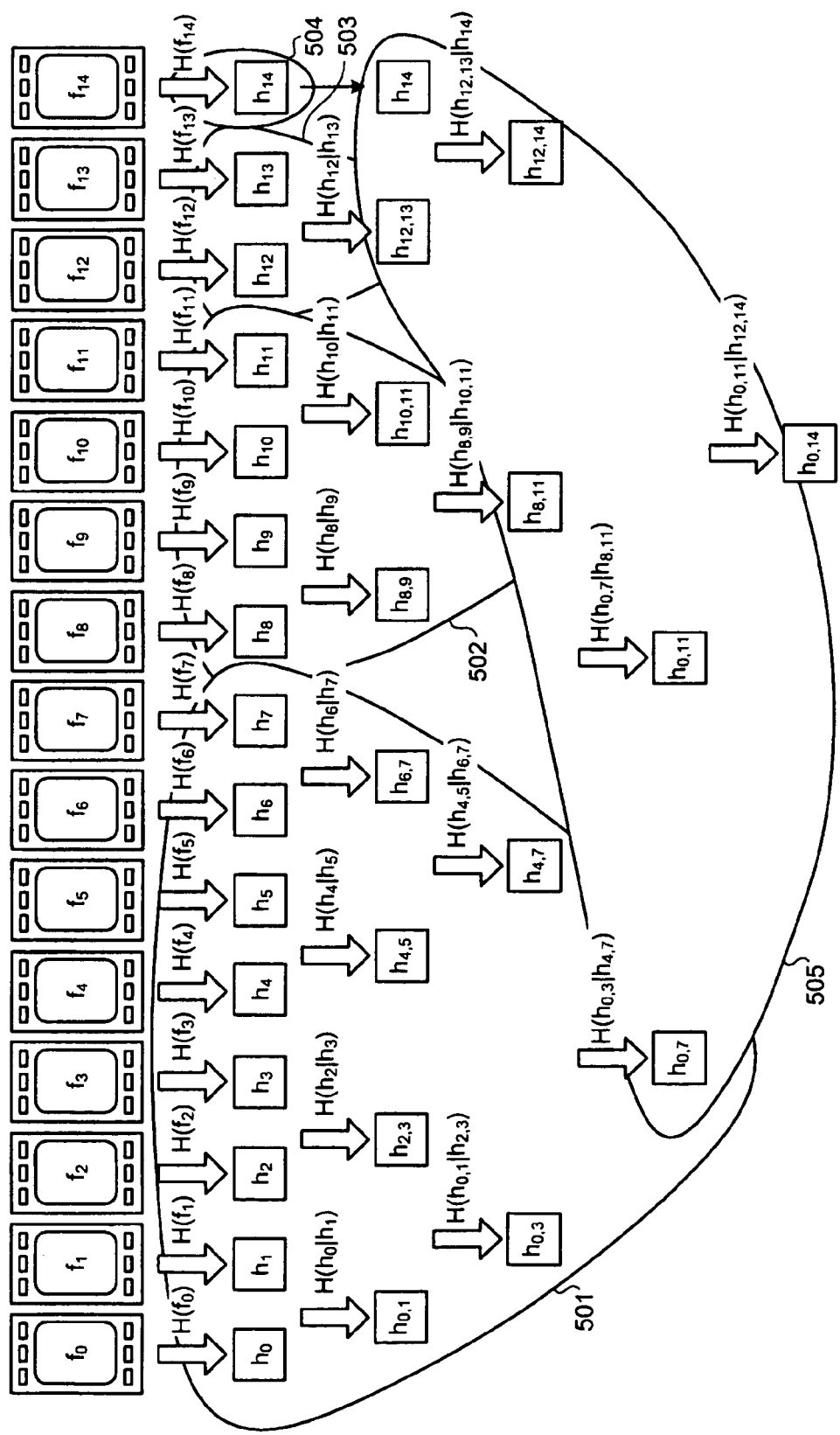
FIG. 5 depicts a hash tree generated by an execution of the first storage processing and the second storage processing.

FIG. 5 depicts a hash tree generated by the execution of the first storage processing and the second storage processing. Areas respectively indicated by reference numerals 501 to 504 represent hash trees obtained by the first storage processing. The area indicated by reference numeral 505 represents a hash tree obtained by the second storage processing.

Figure 6:
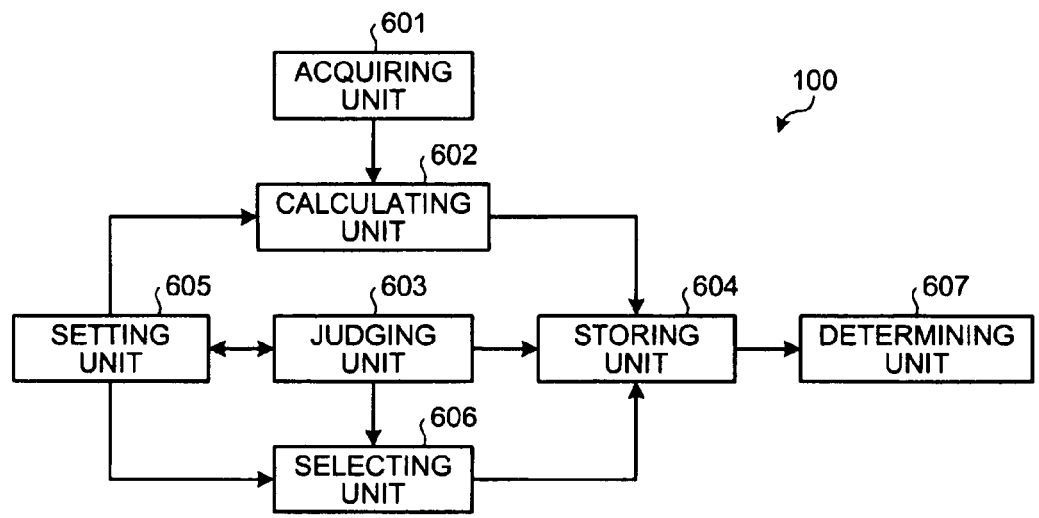
FIG. 6 is a block diagram of a functional configuration of the digital signature apparatus according to the present embodiment.

FIG. 6 is a block diagram of a functional configuration of the digital signature apparatus 100 according to the present embodiment. In FIG. 6, the digital signature apparatus 100 includes an acquiring unit 601, a calculating unit 602, a judging unit 603, a storing unit 604, a setting unit 605, a selecting unit 606, and a determining unit 607. The functions (the acquiring unit 601 to the determining unit 607), which form a control unit, for example, are implemented by the I/F 104 or by executing on the CPU 101, a program stored in a storage device such as the register 106, the memory 102 and the hard disk drive 103 depicted in FIG. 1.

The acquiring unit 601 has a function of acquiring, in order of input, a series of input data $f_0$ to $f_{14}$ that are successively input. For example, the acquiring unit 601 acquires the stream data ST (e.g., a moving picture or audio) which has been divided, as GOP units, into the input data $f_0$ to $f_{14}$ that are sequentially read in at the I/F 104 and output from the buffer 107 of the I/F 104, in the order of input.

The calculating unit 602 has a function of calculating, each time the acquiring unit 601 acquires an input data $f_i$ (where, i indicates the i-th input), a unique value for the input data $f_i$, by substituting the input data $f_i$ into a one-way function. The calculating unit 602 has a further function of calculating a unique value for target data that has been set by the setting unit 605 (described hereinafter). This unique value is calculated by substituting the target data into a one-way function. The target data will be described hereinafter. A one-way function is a function that outputs the amount of characteristics (unique value) unique to the data input and is, for example, the hash function H( ). The hash function H( ) calculates a hash value unique to the data substituted into the hash function H( ).

The judging unit 603 has function of judging whether a target area selected from among the storage area group M to which priority ranks have been assigned, is empty. The storage area group M is the group of storage areas M1 to M5 storing the hash values obtained by the calculating unit 602. For example, the storage area group M may be multiple units of the register 106, or address-designated storage areas in the memory 102 or hard disk of the hard disk drive 103. The target area is a storage area Mj selected by the selecting unit 606 described hereinafter. For example, as depicted by reference character (A) in FIG. 3A, since no hash value is stored in the target area (the storage area M1), the judging unit judges the target area to be empty. On the other hand, as depicted by reference character (B) in FIG. 3A, since the hash value $h_0$ is stored in the target area (the storage area M1), the judging unit judges that the target area to not be empty.

The storing unit 604 has a function of storing to the target area, the unique value calculated by the calculating unit 602 for the input data $f_i$ or that calculated for the target data, if the target area has been judged by the judging unit 603 to be empty. If the area is empty, the storing unit 604 stores the unique value as is. For example, as depicted by reference character (A) in FIG. 3A, since the target area (the storage area M1) is judged to be empty, the storing unit 604 stores the hash value $h_0$ thereto. A case in which the area is not empty will be described hereinafter.

The setting unit 605 has a function of newly setting, as the target data, a concatenated unique value concatenating the unique value stored in the target area and, the unique value of the input data $f_i$ or that of the target data, if the target area is judged to not be empty by the judging unit 603. For example, if the target area is not empty, binary tree processing is executed on the stored unique value and, the unique value of the input data $f_i$ or that of the target data.

In other words, a unique concatenated value hx|hy is generated concatenating the unique value of the current target data and the unique value stored in the target region. "hx|hy" (where, x and y are numbers, and x<y) is a code string in which the tail of the unique value hx and the head of the unique value by are concatenated. Further, hx,y is a new unique value obtained when the concatenated unique value is substituted into a one-way function. In this manner, since the concatenated unique value also becomes target data and if provided to the calculating unit 602, the unique value thereof is calculated.

For example, as depicted by reference character (B) in FIG. 3A, since the hash value $h_0$ is already stored in the target area (the storage area M1), the hash value $h_0$ and the hash value $h_1$ are concatenated, generating a concatenated hash value $h_0|h_1$ that is set as the target data. Since the concatenated hash value $h_0|h_1$ is target data, the concatenated hash value $h_0|h_1$ is given to the calculating unit 602 and the hash value $h_{0,1}$ is calculated.

The selecting unit 606 has a function of selecting, from among the storage area group M, the storage area having the highest priority rank, if a unique value is calculated for the input data $f_i$. For example, if a unique value for the input data $f_i$ is obtained, the storage area having the highest priority rank is selected as the target area.

If the target area is judged to not be empty by the judging unit 603, the selecting unit 606 has a further function of newly selecting as the target area, the storage area having the highest priority after the storage area previously selected as the target area. As a result, the next storage area subject to storing can be secured. For example, as depicted by reference character (B) in FIG. 3A, since the hash value $h_0$ is already stored in the target area (the storage area M1), the storage area M2 having the highest priority rank after the storage area M1 is newly selected as the target area, whereby the hash value $h_{0,1}$ is stored to the empty storage area M2 newly selected as the target area.

The determining unit 607 has a function of determining, after the acquisition of the series of input data $f_0$ to $f_{14}$ and based on the number of unique values stored in the storage area group M, a unique value that is to be the generation origin of the digital signature for the series of input data $f_0$ to $f_{14}$. For example, if a single unique value remains in the storage area group M, that single unique value becomes the root value and is thus, the generation origin of the digital signature for the series of input data $f_0$ to $f_{14}$. On the other hand, if multiple unique values remain, generation of the hash tree is not complete. In this case, the second storage processing is executed (see, FIGS. 4A and 4B). For the transition to the second storage processing, there are 2 transition methods.

The first transition method, as depicted in FIGS. 4A and 4B, involves using a storage area other than the storage area group M as the storage area N to which the hash values stored in the storage area group M are transferred. Subsequently, according to the priority rank of each of the storage areas M1 to M5 in the storage area group M, the hash values are sequentially read out from the storage area N.

In this case, the selecting unit 606 selects, as the target area, the storage area M1 having the highest priority rank among the storage area group M. Subsequently, the judging unit 603 judges whether the target area is empty. If the target area is empty, the hash value read out from the storage area N is stored to the target area as is. If the target area is not empty, as described above, the read hash value and the already stored hash value are concatenated, generating a concatenated hash value regarded as target data.

The selecting unit 606 selects the storage area. M2 having the next highest priority rank and the judging unit 603 judges whether the selected target area is empty. Thereafter, the concatenated hash value is substituted into the hash function H( ) and a new hash value is calculated. If the newly selected target area (the storage area M2) is empty, the new hash value is stored thereto. If the newly selected target area (the storage area M2) is not empty, the selection of a new target area, the judgment of whether the new target area is empty, the generation of a concatenated hash value, and the setting and storage of the target data are repeated.

The second method involves preparing a second storage area group M equivalent to the storage area group (hereinafter, first storage area group) M. In other words, the second storage area group M is of the same number of storage areas and capacity as the first storage area group M and like the first storage area group M, each of the storage areas M1 to M5 are assigned a priority rank. In this case, the acquiring unit 601 sequentially acquires the hash values from the storage areas among the first storage area group M, in descending order of priority rank. Subsequently, the selecting unit 606 selects a target area from among the second storage area group M, the judging unit 603 judges whether the target area is empty, and the storing unit 604 stores the hash value to the target area, if empty. In either transition method, the additional storage area used is equivalent in capacity to the storage area group M and therefore, a saving of memory can be facilitated.

Figure 7:
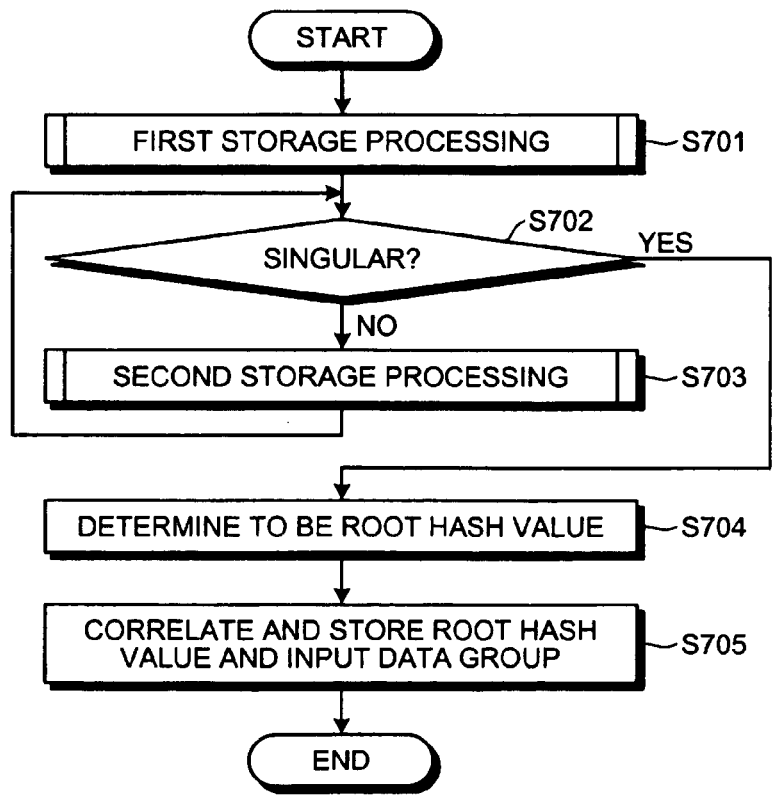
FIG. 7 is a flowchart of a root hash value generation processing procedure according to the present embodiment.

FIG. 7 is a flowchart of a root hash value generation processing procedure according to the present embodiment. The first storage processing is executed (step S701) and it is judged whether the number of hash values after the first storage processing is 1 (step S702). If the number is not 1 (step S702: NO), the second storage processing is executed (step S703) and again, it is judged whether the number of hash values is 1 (step S702). If the number is not 1 (step S702: NO), the second storage processing is executed until the number of hash values becomes 1 (step S703).

On the other hand, at step S702, if the number of hash values is 1 (step S702: YES), the one hash value is determined to be the root hash value (step S704) and the root hash value and the input data group are correlated and stored (step S705). Consequently, the root hash value generation processing ends.

Figure 8:
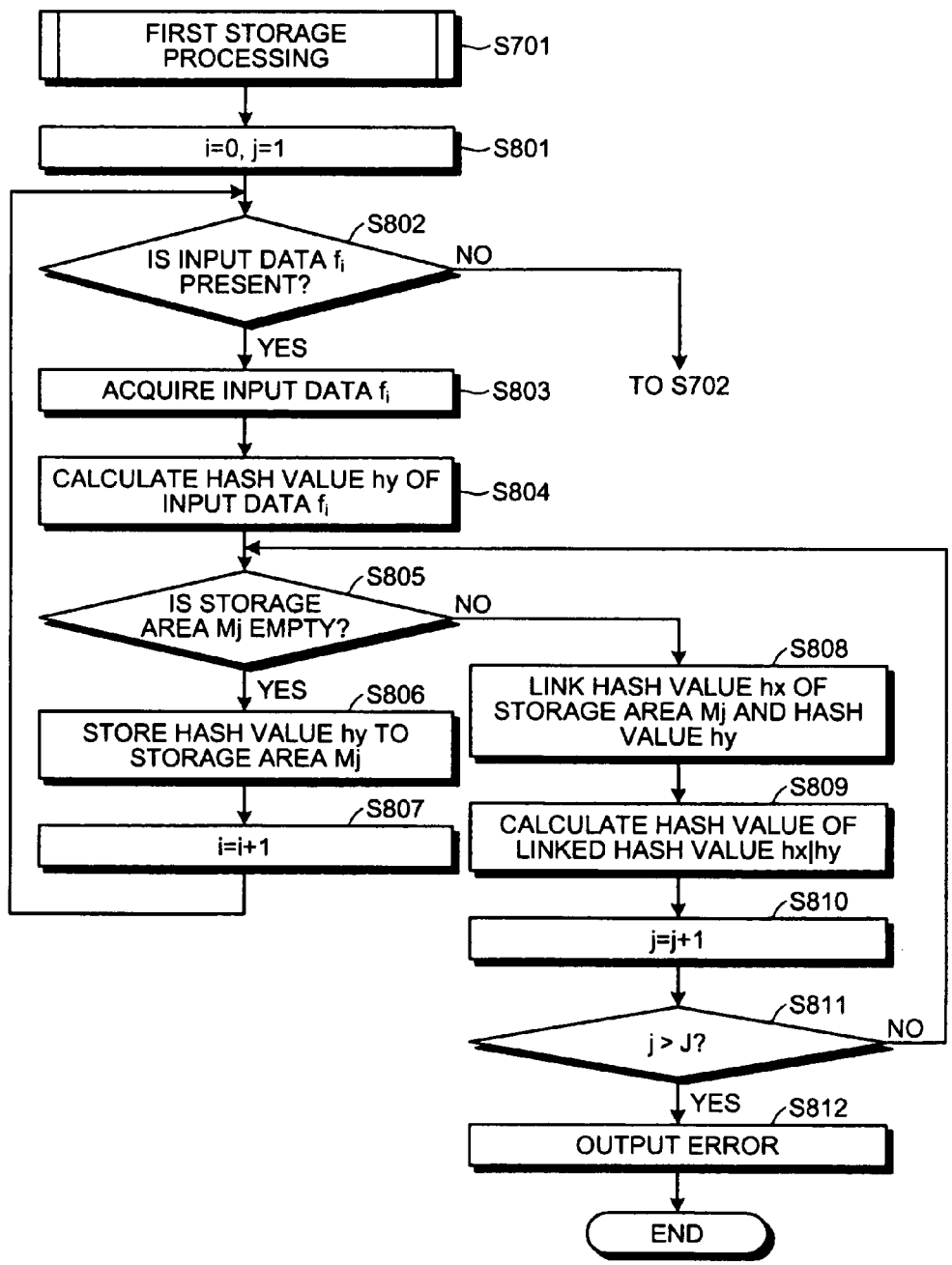
FIG. 8 is a flowchart detailing the first storage process.

FIG. 8 is a flowchart detailing the first storage process (step S701). Variable i, which represents the order of input of an input data $f_i$, is set to 0 and variable j, which indicates the priority rank of the storage area Mj is set to 1 (step S801) and it is determined whether the input data $f_i$ is present (step S802). If the input data $f_i$ is present (step S802: YES), the acquiring unit 601 acquires the input data $f_i$ (step S803) and the calculating unit 602 calculates the hash value hy of the input data $f_i$ (step S804). The judging unit 603 judges whether the storage area Mj is empty (step S805).

If the storage area Mj is empty, (step S805: YES), the storing unit 604 stores the hash value hy to the storage area Mj (step S806). Subsequently, i is incremented (step S807), and the flow returns to step S802. At step S805, if the storage area Mj is not empty (step S805: NO), the hash value hx stored in the storage area Mj is read out and concatenated with the hash value hy, generating the concatenated hash value hx|hy (step S808). Consequently, the concatenated hash value hx|hy is set as new target data and the hash value of the concatenated hash value hx|hy is calculated (step S809).

Subsequently, j is incremented (step S810), whereby the storage area having the next highest priority rank is selected. It is determined whether j>J is true (step S811). J is the total number of storage areas. In the example depicted in FIGS. 3A to 4B, J=5. If j>J is not true (step S811: NO), the flow returns to step S805. On the other hand, if j>J is true (step S811: YES), since there is no storage area to store the hash value hy to, indication of the error is output (step S812), whereby a series of the processes ends. Further, at step S802, if the input data $f_i$ is not present (step S802: NO), the flow transitions to step S702.

Figure 9:
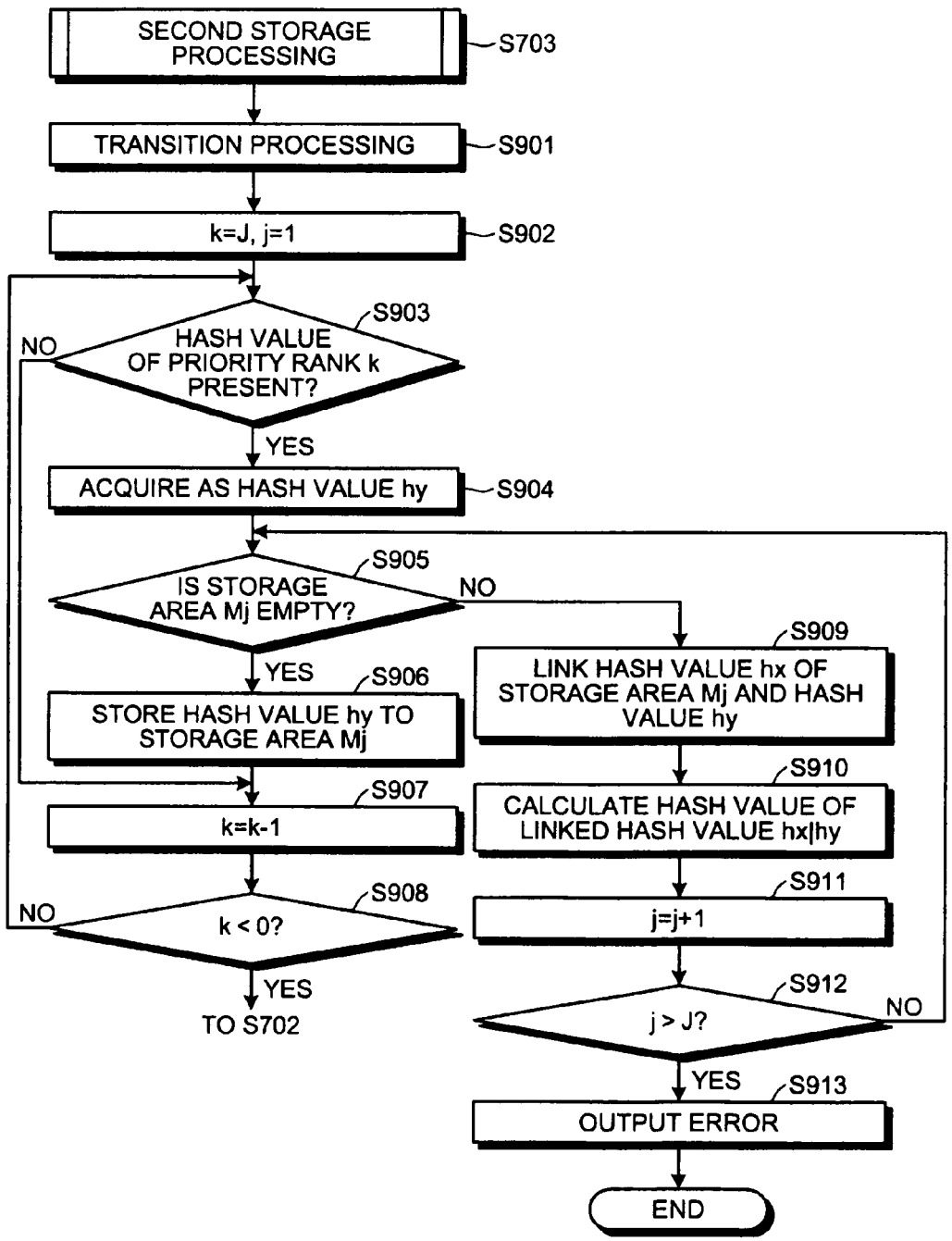
FIG. 9 is a flowchart detailing the second storage processing.

FIG. 9 is a flowchart detailing the second storage processing (step S703). Transition processing (the first or the second transition method above) is executed (step S901). Next, variable k, which indicates the priority rank, is set to J and j is set 1 (step S902). Subsequently, it is determined whether the hash value of the priority rank k is present (step S903). If the hash value of the priority rank k is not present (step S903: NO), the flow transitions to step S907. On the other hand, if the hash value of the priority rank k is present (step S903: YES), the acquiring unit 601 acquires the hash value of the priority rank k as the hash value hy (step S904) and the judging unit 603 judges whether the storage area Mj is empty (step S905).

If the storage area Mj is empty (step S905: YES), the hash value hy is stored to the storage area Mj (step S906). At step S907, k is decremented (step S907) and it is determined whether k<0 is true (step S908). If k<0 is true (step S908: YES), the flow returns to step S702. On the other hand, if k<0 is not true (step S908: NO), the flow returns to step S903. Further, at step S905, if the storage area Mj is not empty (step S905: NO), the hash value hx stored in the storage area Mj is read out and concatenated with the hash value hy, generating the concatenated hash value hx|hy (step S909).

Consequently, the concatenated hash value hx|hy is set as new target data and the hash value of the concatenated hash value hx|hy is calculated (step S910). Subsequently, j is incremented (step S911), whereby the storage area having the next highest priority rank is selected. It is determined whether j>J is true (step S912). If j>J is not true (step S912: NO), the flow returns to step S905. On the other hand, if j>J is true (step S912: YES), since there is no storage area to store the hash value by to, indication of the error is output (step S913), whereby a series of the processes ends.

Figure 11:
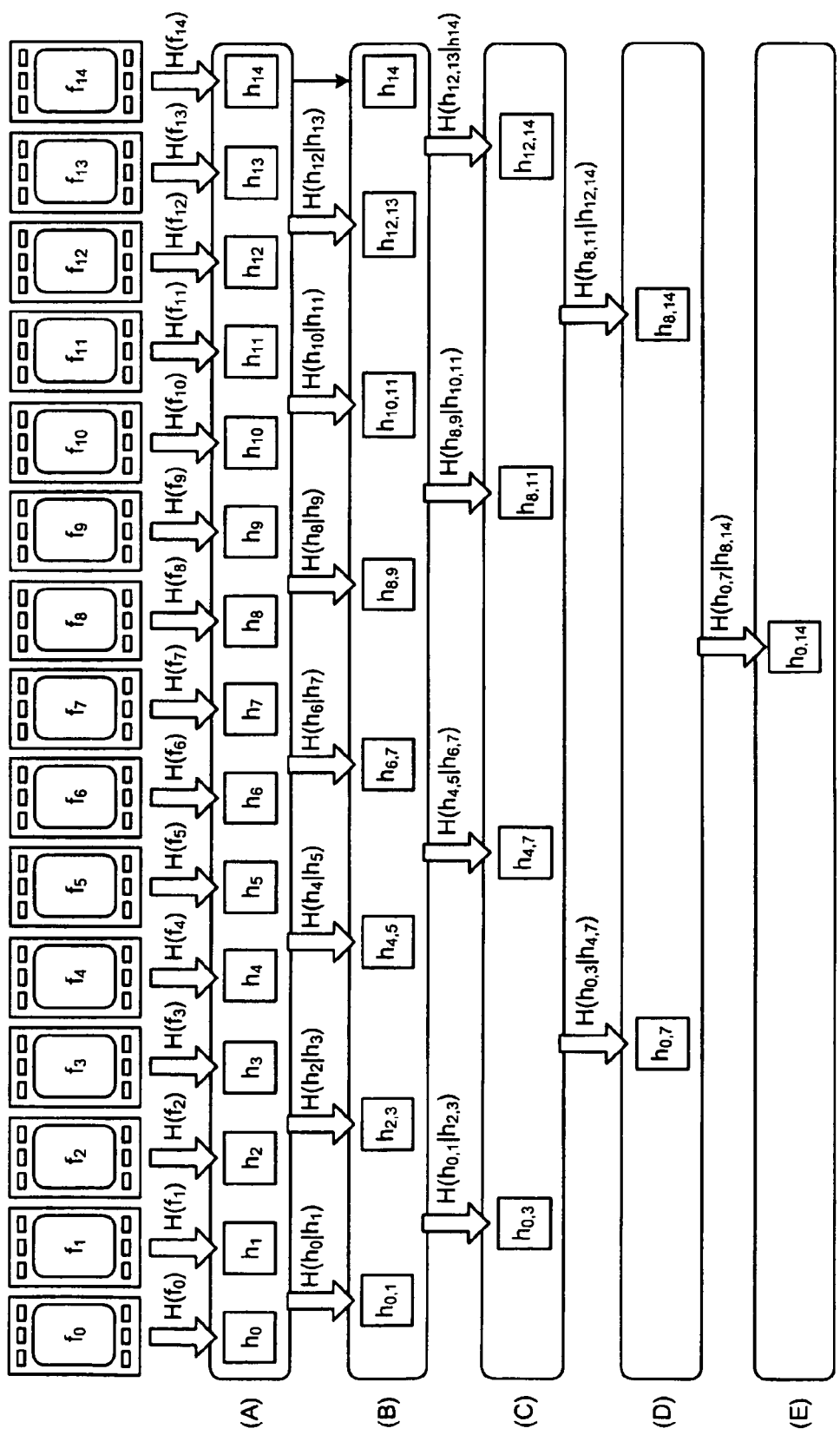
FIG. 11 is a diagram depicting a conventional hash tree generation method.

FIG. 10 is a table comparing the present embodiment and the conventional technology depicted in FIG. 11. In FIG. 10, the number of input data for the conventional technology is n. Further, in FIG. 10, in the present embodiment, successive processing is possible and the number of registers/memory, the number of times hash processing is executed after filming (reading in of input data) are respectively reduced. In this manner, even if the total number of times that hash processing is executed are the same, the present embodiment enables significant reductions in the number of registers/memory and in the time consumed for post-processing after filming.

The hash tree generating method described in the present embodiment may be implemented by executing a prepared program on a computer such as a personal computer and a workstation. The digital signature program is stored on a computer-readable medium such as a hard disk, a flexible disk, a CD-ROM, an MO, and a DVD, read out from the recording medium, and executed by the computer. A computer-readable medium does not include a transitory transmission medium such as a propagation signal. The digital signature program may be distributed through the network 109 such as the Internet.

According to the technology disclosed herein, successive tree generation processing in real-time is enabled, whereby significant reductions in register/memory capacity and in the time consumed for post-processing can realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable medium storing therein a digital signature program that causes a computer to execute a process comprising:
   acquiring in order of input, a series of input data that are successively input;
   calculating a unique value for the acquired input data or for target data, by substituting the input data or the target data into a one-way function;
   judging whether a target area selected from among a storage area group assigned priority ranks is empty;
   storing the unique value calculated for the input data or for the target data to the target area, when the target area is judged to be empty at the judging;
   setting newly as the target data, a concatenated unique value concatenating the unique value stored in the target area and, the unique value that is of the input data and not yet stored in the target area or the unique value that is of the target data and not yet stored in the target area, when the target area is judged to not be empty at the judging;
   selecting from the storage area group and as the target area, the storage area having the highest priority rank, when the unique value of the input data is calculated, and when the target area is judged to not be empty at the judging, newly selecting as the target area, the storage area having the highest priority rank after the storage area previously selected as the target area; and
   determining based on the number of unique values stored in the storage area group after acquisition of the series of input data, a unique value to be a generation origin of a digital signature for the series of input data.

2. The non-transitory computer-readable medium according to claim 1, wherein
   when multiple unique values are stored in the storage area group after the acquisition of the series of input data, the storing includes transferring the unique values from the storage area group to another storage area,
   the acquiring includes acquiring each of the unique values in the other storage area according to the priority rank assigned to the storage area that stored the unique value in the storage area group;
   the storing includes storing the unique values acquired from the other storage area or the unique value calculated for the target data, when the target area is judged to be empty,
   when the target area is judged to not be empty, the setting includes newly setting as the target data, the concatenated unique value concatenating the unique value stored in the target area and the unique value obtained at the acquiring or at the calculating,
   the selecting includes selecting from among the storage area group and as the target area, the storage area having the highest priority rank and when the target area is judged to not be empty, the selecting further includes newly selecting as the target area, the storage area having the highest priority rank after the target area previously selected, and the determining includes determining based on the number of unique values stored in the storage area group after acquisition of the unique values in the other storage area, a unique value to be the generation origin of the digital signature of the series of input data.

3. The non-transitory computer-readable medium according to claim 1, wherein the acquiring includes regarding as the target area, a storage area selected from a second storage area group comprising storage areas respectively assigned a priority rank and equivalent in number to the storage areas comprising the storage area group and when multiple unique values are stored in the storage area group after the acquisition of the series of input data, the acquiring further includes acquiring the unique values from the storage area group, according to the priority ranks assigned to the storage areas of the storage area group, the storing includes storing to the target area, a unique value acquired from the storage area group according to priority rank or the unique value calculated for the target data, when the target area is judged to be empty, when the target area is judged to not be empty, the setting includes newly setting as the target data, the concatenated unique value concatenating the unique value stored in the target area and the unique value obtained at the acquiring or at the calculating, the selecting includes selecting from among the second storage area group and as the target area, the storage area having the highest priority rank and when the target area is judged at the judging to not be empty, the selecting further includes newly selecting as the target area, the storage area having the highest priority rank after the target area previously selected, and the determining includes determining based on the number of unique values stored in the second storage area group after acquisition of the unique values from the storage area group, a unique value to be the generation origin of the digital signature for the series of input data.

4. A digital signature apparatus comprising:

a memory and a processor, the memory and the processor performing:

acquiring, in order of input, a series of input data that are successively input;

calculating a unique value for the acquired input data or for target data, by substituting the input data or the target data into a one-way function;

judging whether a target area selected from among a storage area group assigned priority ranks is empty;

storing the unique value calculated for the input data or for the target data to the target area, when the target area is judged to be empty;

setting newly as the target data, a concatenated unique value concatenating the unique value stored in the target area and, the unique value that is of the input data and not yet stored in the target area or the unique value that is of the target data and not yet stored in the target area, when the target area is judged to not be empty;

selecting from the storage area group and as the target area, the storage area having the highest priority rank, when the unique value of the input data is calculated, and when the target area is judged to not be empty, and selecting as the target area the storage area having the highest priority rank after the storage area previously selected as the target area; and determining, based on the number of unique values stored in the storage area group after acquisition of the series of input data, a unique value to be a generation origin of a digital signature for the series of input data.

5. The digital signature apparatus according to claim 4, wherein when multiple unique values are stored in the storage area group after the acquisition of the series of input data, the storing includes transferring the unique values from the storage area group to another storage area, the acquiring includes acquiring each of the unique values in the other storage area according to the priority rank assigned to the storage area that stored the unique value in the storage area group;

the storing includes storing the unique values acquired from the other storage area or the unique value calculated for the target data, when the target area is judged to be empty, when the target area is judged to not be empty, the setting includes newly setting as the target data, the concatenated unique value concatenating the unique value stored in the target area and the unique value obtained at the acquiring or at the calculating, the selecting includes selecting from among the storage area group and as the target area, the storage area having the highest priority rank and when the target area is judged to not be empty, the selecting further includes newly selecting as the target area, the storage area having the highest priority rank after the target area previously selected, and the determining includes determining based on the number of unique values stored in the storage area group after acquisition of the unique values in the other storage area, a unique value to be the generation origin of the digital signature of the series of input data.

6. The digital signature apparatus according to claim 4, wherein the acquiring includes regarding as the target area, a storage area selected from a second storage area group comprising storage areas respectively assigned a priority rank and equivalent in number to the storage areas comprising the storage area group and when multiple unique values are stored in the storage area group after the acquisition of the series of input data, the acquiring further includes acquiring the unique values from the storage area group, according to the priority ranks assigned to the storage areas of the storage area group, the storing includes storing to the target area, a unique value acquired from the storage area group according to priority rank or the unique value calculated for the target data, when the target area is judged to be empty, when the target area is judged to not be empty, the setting includes newly setting as the target data, the concatenated unique value concatenating the unique value stored in the target area and the unique value obtained at the acquiring or at the calculating, the selecting includes selecting from among the second storage area group and as the target area, the storage area having the highest priority rank and when the target area is judged at the judging to not be empty, the selecting further includes newly selecting as the target area, the storage area having the highest priority rank after the target area previously selected, and the determining includes determining based on the number of unique values stored in the second storage area group after acquisition of the unique values from the storage area group, a unique value to be the generation origin of the digital signature for the series of input data.

7. A digital signature method comprising:
acquiring in order of input, a series of input data that are successively input;
calculating a unique value for the acquired input data or for target data, by substituting the input data or the target data into a one-way function;
judging whether a target area selected from among a storage area group assigned priority ranks is empty;
storing the unique value calculated for the input data or for the target data to the target area, when the target area is judged to be empty at the judging;
setting newly as the target data, a concatenated unique value concatenating the unique value stored in the target area and, the unique value that is of the input data and not yet stored in the target area or the unique value that is of the target data and not yet stored in the target area, when the target area is judged to not be empty at the judging;
selecting from the storage area group and as the target area, the storage area having the highest priority rank, when the unique value of the input data is calculated, and when the target area is judged to not be empty at the judging, newly selecting as the target area, the storage area having the highest priority rank after the storage area previously selected as the target area; and
determining based on the number of unique values stored in the storage area group after acquisition of the series of input data, a unique value to be a generation origin of a digital signature for the series of input data.

8. The digital signature method according to claim 7, wherein
when multiple unique values are stored in the storage area group after the acquisition of the series of input data, the storing includes transferring the unique values from the storage area group to another storage area,
the acquiring includes acquiring each of the unique values in the other storage area according to the priority rank assigned to the storage area that stored the unique value in the storage area group;
the storing includes storing the unique values acquired from the other storage area or the unique value calculated for the target data, when the target area is judged to be empty,
when the target area is judged to not be empty, the setting includes newly setting as the target data, the concatenated unique value concatenating the unique value stored in the target area and the unique value obtained at the acquiring or at the calculating,
the selecting includes selecting from among the storage area group and as the target area, the storage area having the highest priority rank and when the target area is judged to not be empty, the selecting further includes newly selecting as the target area, the storage area having the highest priority rank after the target area previously selected, and
the determining includes determining based on the number of unique values stored in the storage area group after acquisition of the unique values in the other storage area, a unique value to be the generation origin of the digital signature of the series of input data.

9. The digital signature method according to claim 7, wherein
the acquiring includes regarding as the target area, a storage area selected from a second storage area group comprising storage areas respectively assigned a priority rank and equivalent in number to the storage areas comprising the storage area group and when multiple unique values are stored in the storage area group after the acquisition of the series of input data, the acquiring further includes acquiring the unique values from the storage area group, according to the priority ranks assigned to the storage areas of the storage area group,
the storing includes storing to the target area, a unique value acquired from the storage area group according to priority rank or the unique value calculated for the target data, when the target area is judged to be empty,
when the target area is judged to not be empty, the setting includes newly setting as the target data, the concatenated unique value concatenating the unique value stored in the target area and the unique value obtained at the acquiring or at the calculating,
the selecting includes selecting from among the second storage area group and as the target area, the storage area having the highest priority rank and when the target area is judged at the judging to not be empty, the selecting further includes newly selecting as the target area, the storage area having the highest priority rank after the target area previously selected, and
the determining includes determining based on the number of unique values stored in the second storage area group after acquisition of the unique values from the storage area group, a unique value to be the generation origin of the digital signature for the series of input data.

* * * * *